US010466693B1

(12) United States Patent
Sait

(10) Patent No.: US 10,466,693 B1
(45) Date of Patent: *Nov. 5, 2019

(54) UNMANNED AERIAL VEHICLE DATA SERVICES

(71) Applicant: Amazon Technologies, Inc., Seattle, WA (US)

(72) Inventor: Abdul Sathar Sait, Redmond, WA (US)

(73) Assignee: Amazon Technologies, Inc., Seattle, WA (US)

( * ) Notice: Subject to any disclaimer, the term of this patent is extended or adjusted under 35 U.S.C. 154(b) by 3 days.

This patent is subject to a terminal disclaimer.

(21) Appl. No.: 16/053,416

(22) Filed: Aug. 2, 2018

Related U.S. Application Data

(63) Continuation of application No. 14/547,038, filed on Nov. 18, 2014, now Pat. No. 10,073,449.

(51) Int. Cl.
*G05D 1/00* (2006.01)
*H04L 29/06* (2006.01)
(Continued)

(52) U.S. Cl.
CPC ....... *G05D 1/0027* (2013.01); *H04L 63/0442* (2013.01); *H04L 63/0876* (2013.01);
(Continued)

(58) Field of Classification Search
CPC . H04L 63/0428; H04L 63/0442; H04L 63/08; H04L 63/083; H04L 63/0876;
(Continued)

(56) References Cited

U.S. PATENT DOCUMENTS 7,024,340 B2    4/2006  Nichols et al.
7,840,742 B2   11/2010  Berland et al.
(Continued)

FOREIGN PATENT DOCUMENTS

EP    2605609    6/2013

OTHER PUBLICATIONS

U.S. Appl. No. 14/547,038, "Final Office Action," dated Nov. 23, 2016, 24 pages.
(Continued)

*Primary Examiner* — Zachary A. Davis
(74) *Attorney, Agent, or Firm* — Kilpatrick Townsend & Stockton LLP

(57) ABSTRACT

Techniques for using an aerial vehicle to provide a data service are provided. For example, information about a request for the data service is accessed. The request is sent to a provider computing device and identifies a user computing device to receive the data service. The provider computing device is configured to provide the data service. A location associated with providing the data service is determined based on the request. The aerial vehicle is flown to the location. The aerial vehicle includes a computing system configured to provide a portion of the data service. Based on detecting that the aerial vehicle is within a range of the location, the aerial vehicle provides the portion of the data service to the user computing device by using, for example, the computing system.

20 Claims, 8 Drawing Sheets

(51) Int. Cl.
  *H04W 48/04* (2009.01)
  *H04L 29/08* (2006.01)
  *H04W 84/18* (2009.01)
  *H04W 4/44* (2018.01)
  *H04W 16/20* (2009.01)

(52) U.S. Cl.
  CPC .............. *H04L 67/12* (2013.01); *H04L 67/28* (2013.01); *H04W 4/44* (2018.02); *H04W 16/20* (2013.01); *H04W 48/04* (2013.01); *H04W 84/18* (2013.01)

(58) Field of Classification Search
  CPC ......... H04L 67/12; H04L 67/18; H04L 67/28; H04W 4/18; H04W 4/22; H04W 16/18; H04W 16/20; H04W 48/04; H04W 84/18; H04W 84/22
  See application file for complete search history.

(56) References Cited

U.S. PATENT DOCUMENTS

| | | | |
|---|---|---|---|
| 7,890,757 B2 | 2/2011 | Sudhakar | |
| 8,224,518 B2 | 7/2012 | Cameron et al. | |
| 8,281,136 B2 | 10/2012 | Ramakrishna | |
| 8,490,165 B2 | 7/2013 | Wray et al. | |
| 8,565,689 B1 | 10/2013 | Rubin et al. | |
| 8,825,226 B1 | 9/2014 | Worley, III et al. | |
| 8,867,418 B2 | 10/2014 | Donepudi et al. | |
| 9,086,937 B2 | 7/2015 | Arrouye et al. | |
| 9,260,028 B2 | 2/2016 | Worley, III et al. | |
| 9,354,296 B2 | 5/2016 | Ubhi et al. | |
| 9,359,074 B2 | 6/2016 | Ganesh et al. | |
| 9,374,369 B2 | 6/2016 | Mahaffey et al. | |
| 9,390,281 B2 | 7/2016 | Whaley et al. | |
| 9,454,151 B2 | 9/2016 | Srivastava et al. | |
| 9,780,950 B1 | 10/2017 | Dundas et al. | |
| 9,847,983 B1 | 12/2017 | Roth et al. | |
| 10,073,449 B1 * | 9/2018 | Sait | H04L 67/12 |
| 2004/0010682 A1 | 1/2004 | Foster et al. | |
| 2012/0093087 A1 | 4/2012 | Chen et al. | |
| 2014/0277854 A1 | 9/2014 | Jones et al. | |
| 2014/0317408 A1 | 10/2014 | Runcie | |
| 2016/0189101 A1 | 6/2016 | Ubhi et al. | |
| 2016/0196525 A1 | 7/2016 | Ubhi et al. | |
| 2016/0214717 A1 | 7/2016 | De Silva et al. | |
| 2016/0216711 A1 | 7/2016 | Ubhi et al. | |
| 2016/0247404 A1 | 8/2016 | Ubhi et al. | |
| 2017/0270314 A1 | 9/2017 | Tsybrovskyy et al. | |

OTHER PUBLICATIONS

U.S. Appl. No. 14/547,038, "Final Office Action," dated Jan. 11, 2018, 30 pages.
U.S. Appl. No. 14/547,038, "Non-Final Office Action," dated Jun. 6, 2016, 20 pages.
U.S. Appl. No. 14/547,038, "Non-Final Office Action," dated Jul. 14, 2017, 26 pages.
U.S. Appl. No. 14/547,038, "Notice of Allowance," dated Jun. 4, 2018, 17 Pages.
Fogarty, "DARPA Turning Drones Into WiFi Hotspots", EE Times, Apr. 17, 2014, 3 pages.
Lavars, "Bizzby begins trials of its peer-to-peer drone delivery service", Gizmag, Retrieved from http://www.gizmag.com/bizzby-trials-peer-drone-delivery-service/34636/, Nov. 6, 2014, 7 pages.
Todd et al., "A Different Approach to Sensor Networking for SHM: Remote Powering and Interrogation with Unmanned Aerial Vehicles", In Proceedings of the 6th International Workshop on Structural Health Monitoring, 2007, 16 pages.
Wikipedia, "Data mule," Feb. 15, 2010, 2 pages.
Wikipedia, "Sneakernet," Oct. 3, 2014, 7 pages.

* cited by examiner

UNMANNED AERIAL VEHICLE DATA SERVICES

CROSS REFERENCE TO RELATED APPLICATIONS

This application is a continuation of U.S. Non-Provisional patent application Ser. No. 14/547,038, filed Nov. 18, 2014, and entitled "UNMANNED AERIAL VEHICLE DATA SERVICES," the content of which is herein incorporated by reference in its entirety.

BACKGROUND

More and more users are turning to network-based resources to access various types of services. For example, a network-based resource, such as a data center, may be configured to host computing services or to store data for a user. Typically, to access these and other network-based services, the user operates a computing device to connect to the network-based resource over a network. The network may facilitate a data exchange, and accordingly the services, between the network-based resource and the computing device.

BRIEF DESCRIPTION OF THE DRAWINGS

Various embodiments in accordance with the present disclosure will be described with reference to the drawings, in which.

DETAILED DESCRIPTION

Figure 1:
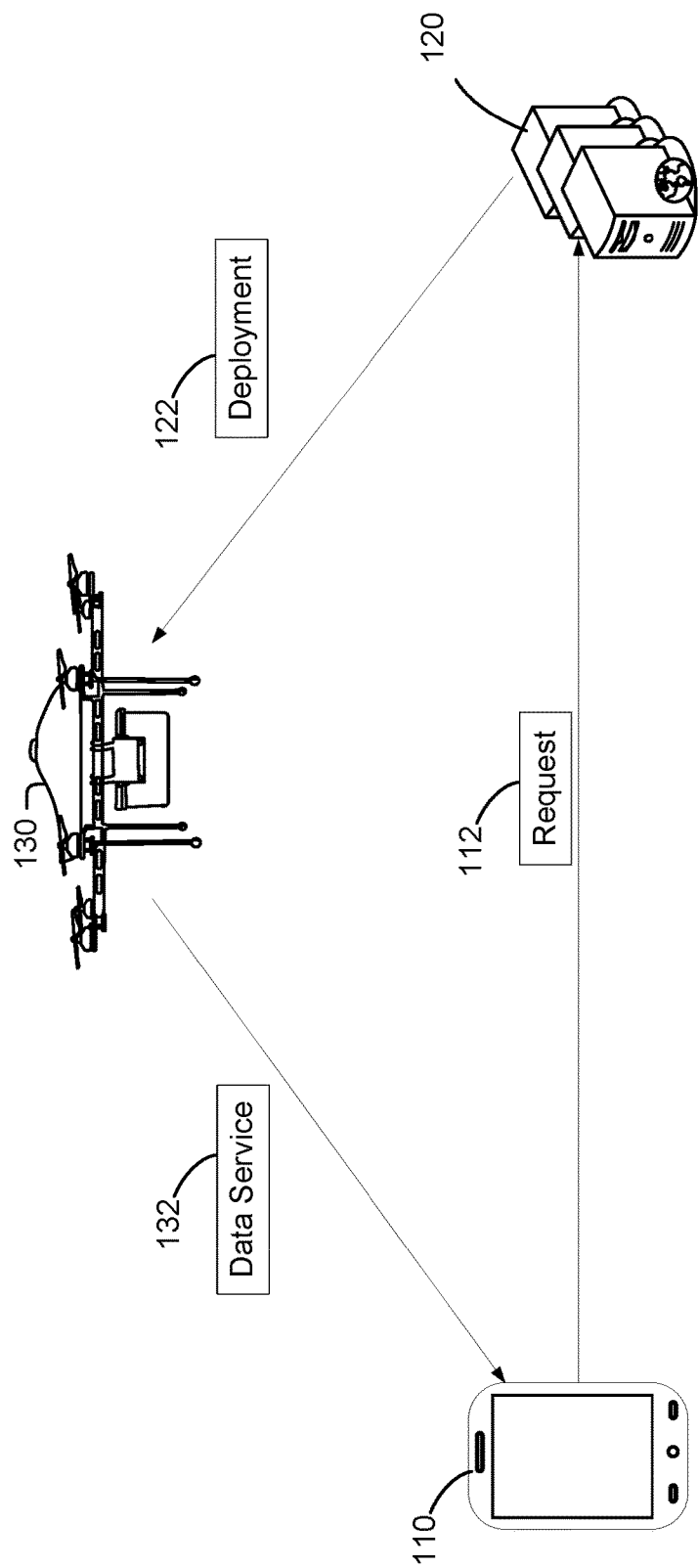
FIG. 1 illustrates an example environment for providing a data service, according to embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of the present disclosure are directed to, among other things, techniques relating to configuring a vehicle to provide a data service. In the interest of clarity of explanation, example unmanned aerial vehicles (UAVs) are described. Nonetheless, the techniques disclosed herein may similarly apply to other types of vehicle, whether manned or unmanned and/or whether aerial or non-aerial. In particular, a UAV may be used to provide a data service to a user on behalf of a service provider. The service provider may operate a network-based resource to provide various network-based services. Typically, the user may operate a computing device to access some or all of the services over a network. However, in certain situations, access may be limited by the network. For example, a network connection may not exist or may be down, or a network bandwidth may not be large enough or may be too expensive to use. As such, the service provider may configure the UAV to provide a data service to bypass the network. In this way, the UAV may be used to exchange or deliver data between the computing device and the network-based resource in lieu of the network. The data service provided by the UAV may thereby facilitate a portion of the network-based services.

To illustrate, consider an example of data storage as a network-based service. In this example, a service provider may operate, for instance, a data center for storing data received from a user computing device. As part of this service, the service provider may also make a UAV available for moving data. For instance, the UAV may include a large capacity storage device and a high speed data interface. If the user computing device is located at a remote location where network bandwidth may be scarce, or if the amount of data is too large relative to the network bandwidth, an associated user may turn to the UAV. For example, the user may request the data to be delivered to the data center on a periodic basis or some other time interval. In turn, the request may be translated into a flight and data delivery plan. Accordingly, the UAV may fly to a location of the user computing device, may receive the data from the user computing device via the high speed interface, may store the data on the large capacity storage device, and may fly back to the data center. Upon arrival, the UAV may interface with a computing device at the data center via, for instance, the high speed interface, to transmit the data from the large capacity storage device. As such, the data may be received and stored at the data center without using a network between the data center and the user computing device.

In another illustration, consider an example of data connectivity as a network-based service. In this example, a service provider may operate a network to provide cellular or other types of data connectivity. In a certain area or during certain peak demand time periods, the data connectivity may suffer. Accordingly, the service provider may deploy a UAV to the area. The UAV may be configured as a network node to route data between user computing devices and the network of the service provider or a public network. For instance, the UAV may include a picocell, femtocell, or other network components (e.g., antenna, base station). As such, a user computing device located in the area may connect to the UAV to access the network.

Turning to FIG. 1, that figure illustrates an example computing environment for providing a data service. In particular, a client 110 may request a data service 132 from a server 120 of a service provider. To provide the data service 132, the service provider may deploy a UAV 130 configured to facilitate a portion of the data service 132.

The client 110 may represent a computing device of a user and may provide an interface to the user to submit a request 112 for the data service 132. An example of the client 110 is further illustrated in FIG. 4. In an example, the client 110 may connect to the server 120 over a data network. The user interface may allow the user to submit a web request or an application programming interface (API) call over the data network. In another example, a data network may not be used. Instead, the client 110 may allow the user to call an administrator or a customer center associated with the server 120 to submit the request 112.

The request 112 may include various information associated with the client 110 and the data service 132. For example, the request 112 may include a location, a time-frame, and a type of the data service 132. The location may be that of the client 110 if the client 110 is the recipient of the data service 132 as illustrated in FIG. 1. The location may additionally or alternatively be of another user computing device. For example, the other computing device may be a recipient of the data service 132. To illustrate, the user may store user data on a local server and may operate the client 110 to request the user data to be sent from the local server to the server 120. In this example, the local server may be the recipient of the data service 132 and, thus, the requested location may be that of the local server. The time frame may include a time period during which the data service 132 is requested. In an example, the time period may be a scheduled time period recurring based on a time interval (e.g., periodically). The type of the data service 132 may include, for example, data storage, data connectivity, and other data-related services. Data storage may include storing data at the server 120 for the client 110. Data connectivity may include using the server 120 to facilitate or provide the client 110 with access to a data network.

The server 120 may represent a collection of computing devices associated with the service provider and configured to provide various services to clients. An example of the server 120 is further illustrated in FIG. 3. In an example, the server 120 may include a front end and a back end. The client 110 may connect to the front end to submit the request 112. The front end may authenticate the client, process the request 112, and transmit information from the request 112 to a data service management module. The data service management module may be hosted at the back end or distributed between the front end and the back end.

In an example, the data service management module may be configured to facilitate the data service 132. For example, the data service management module may be configured to select a UAV 130 from a fleet of UAVs, interact with the UAV for deployment 122, and interact with the UAV to receive data from a recipient computing device of the data service 132. The selection of the UAV may be based on various factors associated with the client 110, the server 120, and the requested data service 132. For example, the data service management module may select a UAV that may be the closest to the requested location, not scheduled to service other clients, and have sufficient data storage or computing capacity to provide the data service 132. Interacting with the UAV for deployment 122 may include transmitting information to the UAV to allow the UAV to provide the data service 132 to the recipient computing device. For example, the information may include information from the request 112, such as the location, time frame, and type of the data service 132. The information may also include an identifier of the recipient computing device, tokens, credentials, and/or other security-related information to ensure that only the recipient computing device may receive the data service 132. Interacting with the UAV to receive the data may include using an interface, wired or wireless, to receive the data. Based on the data service 132, the data service management module may further direct and route the data to a computing resource of the server 120.

The UAV 130 may represent a UAV configured to provide the data service 132. An example of the UAV 130 is further illustrated in FIG. 2. In an example, the UAV 130 may include a computing system configured to provide the data service 132. The computing system may include a data service module stored on a memory and executed by a processor and may include a storage device. The data service module may interact with the data service management module of the server 120 to facilitate the data service 132.

The data service 132 may include moving data from one computing device to another computing device. For example, the data service may include uploading data from a recipient computing device onto a storage device of the UAV 130 and downloading the data from the storage device to a computing resource of the server 120. In another example, the data service 132 may include routing the data from the recipient computing device to the computing resource.

As such, by using the computing environment of FIG. 1, a service provider may extend services offered to users. For example, the service provider may operate a fleet of UAVs configured to provide data services. If a user needs to bypass a data network or if a data network may not exist, the user may nonetheless request a data service. In turn, the service provider may deploy a UAV to satisfy the request. In this way, quick and efficient extension of services may be performed.

Figure 2:
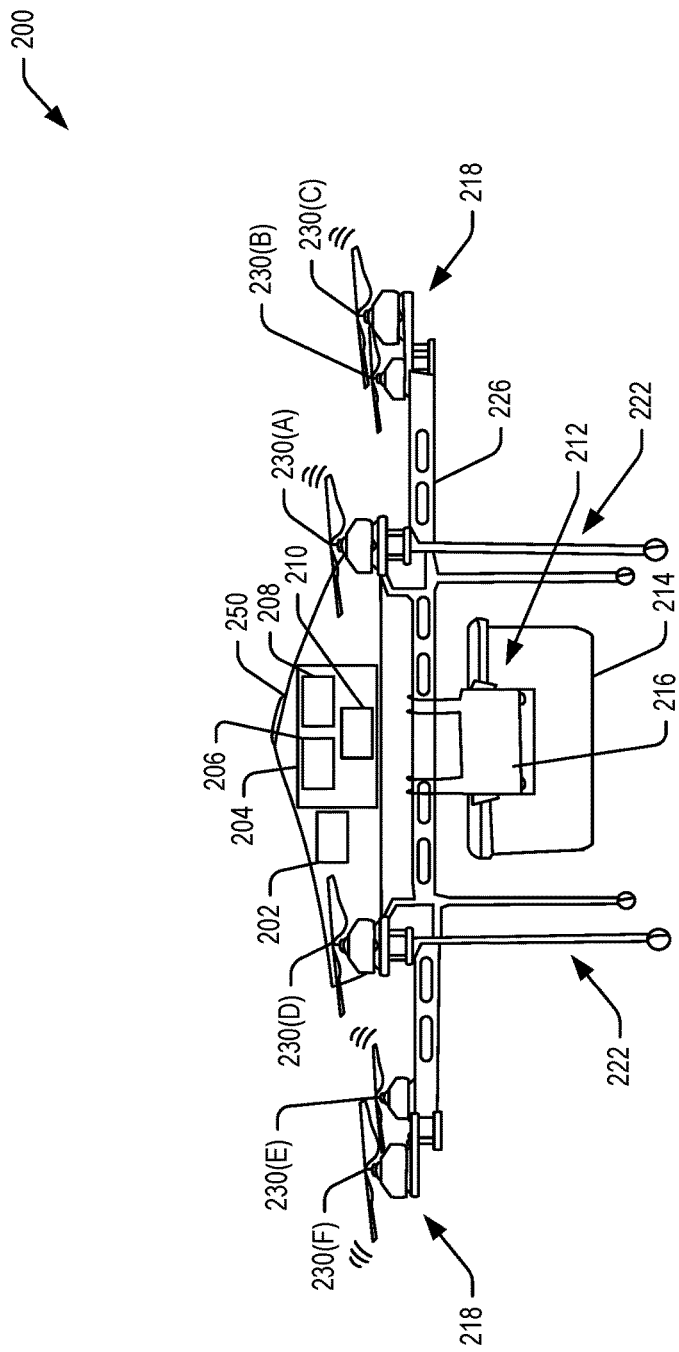
FIG. 2 illustrates an example aerial vehicle configured to facilitate a data service, according to embodiments.

Turning next to FIG. 2, an example UAV 200 configured to provide data services is shown. The UAV 200 may be an example of the UAV 130 described in connection with FIG. 1. The UAV 200 may be designed in accordance with commercial aviation standards and may include multiple redundancies to ensure reliability. In particular, the UAV 200 may include a plurality of systems or subsystems operating under the control of, or at least partly under the control of, a management system 202. The management system 202 may include an onboard computer hosting a management module for autonomously or semi-autonomously controlling and managing various operations of the UAV 200 and, in some examples, for enabling remote control by a pilot. The various operations may include managing other components of the UAV 200, such as a propulsion system 218 to facilitate flights. Portions of the management system 202, including the onboard computer, may be housed under top cover 250. In an example, the management system 202 may include a power supply and assemblies (e.g., rechargeable battery, liquid fuel, and other power supplies) (not shown), one or more communications links and antennas (e.g., modem, radio, network, cellular, satellite, and other links for receiving and/or transmitting information) (not shown), one or more navigation devices and antennas (e.g., global positioning system (GPS), inertial navigation system (INS), range finder, Radio Detection And Ranging (RADAR), and other systems to aid in navigating the UAV 200 and detecting objects) (not shown), and radio-frequency identification (RFID) capability (not shown).

The UAV 200 may also include a computing system 204 configured to provide the data services. In an example, the computing system 204 may be integrated with the management system 202. In another example, the computing system 204 may be separate from but may interface with the management system 202. As illustrated in FIG. 2, the computing system 204 may be housed within the top cover 250 and may include a number of components, such as a computer 206, a storage device 208, and an interface 210. The computer 206 may host a data service module configured to provide a portion or all of the data services. For example, the data service module may access information associated with a request for a data service, may send some of the information (e.g., location of recipient computing device and time frame) to the management system, may authenticate the recipient computing device, and may cause the computing system 204 to exchange data with the recipient computing device and a provider computing device. The data service module may provide other data service-related operations as further described in the next figures. The storage device 208 may represent a high capacity storage medium, such as a volatile or non-volatile semiconductor, magnetic, or optical storage medium. In an example, the storage device 208 may include one or more terabyte, or larger, hard drives. The interface 210 may represent an interface for exchanging data as part of providing the data services. As such, the interface 210 may include high speed interfaces, wired and/or wireless, serial and/or parallel, to enable fast upload and download of data to and from the computer system 204. In an example, the interface 210 may include USB ports, fiber optics ports, IEEE 802.11 interfaces, IEEE 802.16 interfaces, BLUETOOTH interfaces, near field communication interfaces, or cellular interfaces. In a further example, the interface 210 may be configured to allow a user to upload data to the storage device 208, while prohibiting any user but the service provider, from downloading the data from the storage device 208. For instance, this configuration may include using a one directional upload port and a proprietary one directional download port. Additionally or alternatively, this configuration may rely on a user authentication and may include enabling the upload and/or download based on the user authentication.

As shown in FIG. 2, the UAV 200 may also include a retaining system 212. The retaining system 212 may be configured to retain payload 214. In some examples, the retaining system 212 may retain the payload 214 using friction, vacuum suction, opposing arms, magnets, and other retaining methods. As illustrated in FIG. 2, the retaining system 212 may include two opposing arms 216 (only one is illustrated) configured to retain the payload 214. In an example, the payload 214 may include a data storage device of a user. The management system 202 may be configured to control at least a portion of the retaining system 212. In some examples, the retaining system 212 may be configured to release the payload 214 in one of a variety of ways. For example, the retaining system 212 (or other system of the UAV 200) may be configured to release the payload 214 with a winch and spool system, by the retaining system 212 releasing the payload, by fully landing on the ground and releasing the retaining system 212, and other methods of releasing the payload 214. In some examples, the retaining system 212 may operate semi-autonomously or autonomously.

In a further example, the retaining system 212 may be configured to not only retain storage devices of users, but to also connect such devices to the computing system 204. For instance, the retaining system 212 may include a data port to which a user storage device may connect. This port may also interface with the computing system 204. To illustrate, the retaining system 212 may include a USB hub to which USB hard drives or USB flash drives may be connected. As such, when the user storage device is retained by the retaining system 212, the computing system 204 may have access to the data on the user storage device. This access may enable a number of operations related to the data services, such as for example, downloading the data from the user storage device to a provider computing device.

Further, the UAV 200 may include a propulsion system 218. In some examples, the propulsion system 218 may include rotary blades or otherwise be a propeller-based system. As illustrated in FIG. 2, the propulsion system 218 may include a plurality of propulsion devices, a few of which, 230(A)-230(F), are shown in this view. Each propeller device may include one propeller, a motor, wiring, a balance system, a control mechanism, and other features to enable flight. In some examples, the propulsion system 218 may operate at least partially under the control of the management system 202. In some examples, the propulsion system 218 may be configured to adjust itself without receiving instructions from the management system 202. Thus, the propulsion system 218 may operate semi-autonomously or autonomously.

The UAV 200 may also include landing structure 222. The landing structure 222 may be adequately rigid to support the UAV 200 and the payload 214. The landing structure 222 may include a plurality of elongated legs which may enable the UAV 200 to land on and take off from a variety of different surfaces. The plurality of systems, subsystems, and structures of the UAV 200 may be connected via frame 226. The frame 226 may be constructed of a rigid material and be capable of receiving via different connections the variety of systems, sub-systems, and structures. For example, the landing structure 222 may be disposed below the frame 226 and, in some examples, may be formed from the same material and/or same piece of material as the frame 226. The propulsion system 218 may be disposed radially around a perimeter of the frame 226 or otherwise distributed around the frame 226. In some examples, the frame 226 may attach or be associated with one or more fixed wings.

Figure 3:
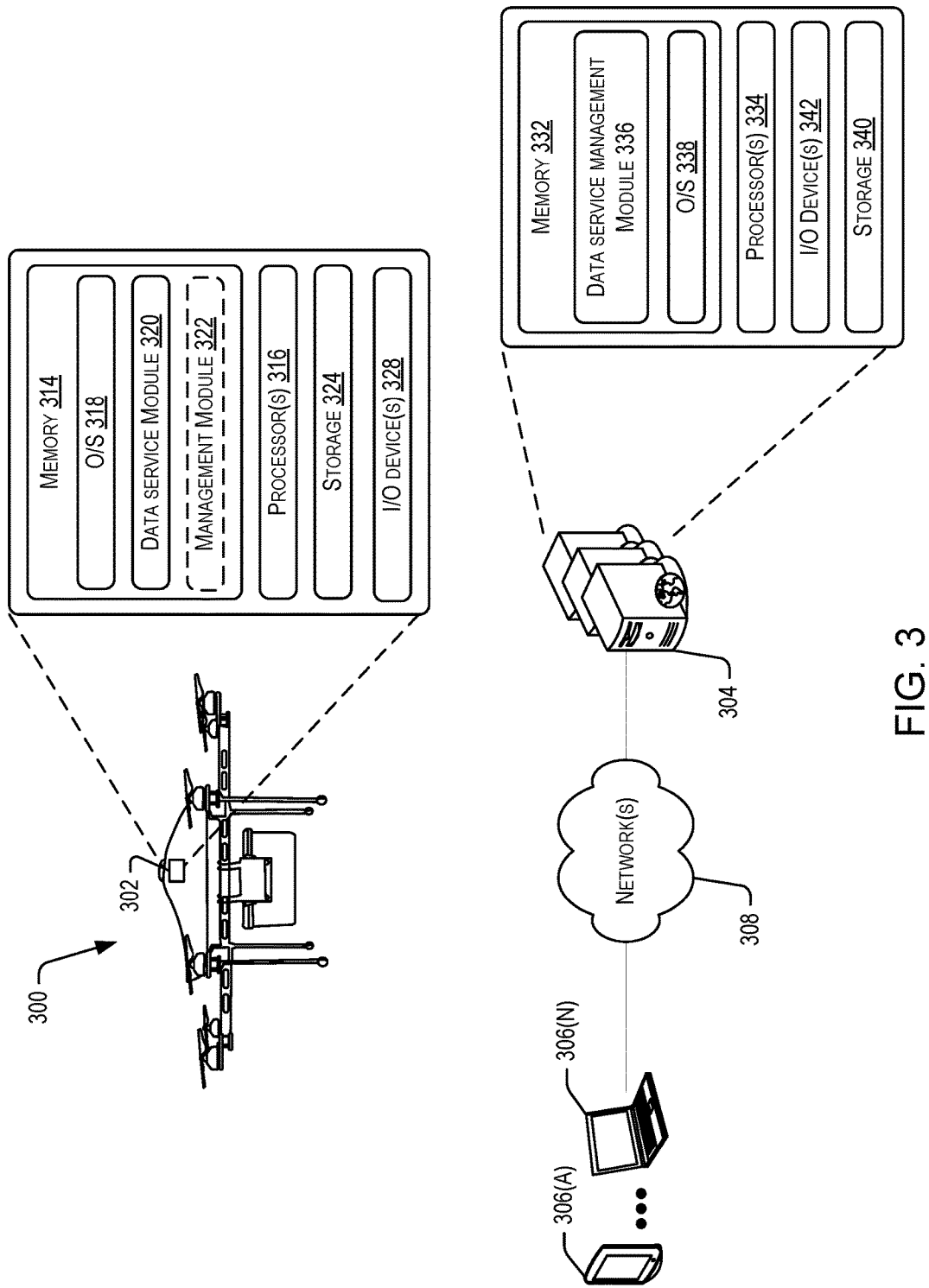
FIG. 3 illustrates an example computing architecture for providing a data service, according to embodiments.

Turning next to FIG. 3, an example computing architecture configured to provide data services is shown. The architecture may include a UAV 300, a server 304, clients 306(A)-(N) (which may be referred to herein as a client 306 or clients 306), and a network 308. Generally, the architecture may facilitate an electronic marketplace for offering various data services, such as data storage and data connectivity. In this manner, a client 306 may request a data service from the server 304 over the network 308. In turn, the server 304 may deploy the drone 300 to provide at least a portion of the data service.

The client 306 may represent a user computing device operated by a user to request the data service. For example, the client 306 may be any suitable device capable of communicating with the server 304 over the network 308. An example of the client 306 is further illustrated in FIG. 4. Generally, the client 306 may be any suitable computing device such as, but not limited to, a mobile phone, a smart phone, a personal digital assistant (PDA), a laptop computer, a thin-client device, a tablet, a desktop computer, a set-top box, or other computing device. More particularly, the client 306 may include a memory, a processor, a user-interface, a web-service application, and any other suitable feature. The web service application may be in the form of a web browser, an application programming interface (API), virtual computing instance, or other suitable application. In an example, the client 306 may but need not be the recipient of the requested data.

The network 308 may include any one or a combination of many different types of networks, such as wireless networks, cable networks, cellular networks, radio networks, the Internet, and other private and/or public networks. In an example, the client 306 may connect to the server 304 over the network 308 to request the data service. However, the data service may not be provided over the network 308. Instead, the data service 308 or a portion of the data service may be provided by the UAV 300. For example, if the data service includes storing data from the client 306 to the server 304, the UAV 300 rather than the network 308 may be used to move the data from the client 306 to the server 304.

Turning now to the details of the server 304, the server 304 may include one or more service provider computers, such as servers and other suitable computing devices, configured to offer various data services to users. The server 304 may be configured to host a website (or combination of websites) viewable via the client 306. The website may be accessible to the client 306 via a web browser and may enable the client to request a data service. Additionally or alternatively, the requests may be submitted via API calls. In addition to the interface with the client 306, the server 304 may also host the data services for the client 306. For example, the server 304 may be configured to provide data storage, data connectivity, and/or other data-related capabilities to the client 306. To provide such services, data may be received from the client 306 or from another computing device associated with the client 306. As described herein above, this data need not be received over the network 308. Instead, the UAV 300 may be used to move the data to the server 304.

In embodiments, the server 304 may be executed by one or more virtual machines implemented in a hosted computing environment. The hosted computing environment may include one or more rapidly provisioned and released network-based resources. Such network-based resources may include computing, networking, and/or storage devices. A hosted computing environment may also be referred to as a cloud computing environment. In some examples, the server 302 may include one or more servers, perhaps arranged in a cluster, or as individual servers not associated with one another.

In one illustrative configuration, the server 304 may include at least one memory 332 and one or more processing units (or processor(s)) 334. The processor(s) 334 may be implemented as appropriate in hardware, computer-executable instructions, software, firmware, or combinations thereof. Computer-executable instruction, software or firmware implementations of the processor(s) 334 may include computer-executable or machine-executable instructions written in any suitable programming language to perform the various functions described. The memory 332 may include more than one memory and may be distributed throughout the management module 302. The memory 332 may store program instructions (e.g., data service management module 336) that are loadable and executable on the processor(s) 334, as well as data generated during the execution of these programs. Depending on the configuration and type of memory, the memory 332 may be volatile (such as random access memory (RAM)) and/or non-volatile (such as read-only memory (ROM), flash memory, or other memory).

The server 304 may also include additional removable storage and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 332 may include multiple different types of memory, such as static random access memory (SRAM), dynamic random access memory (DRAM), or ROM.

Turning to the contents of the memory 332 in more detail, the memory 332 may include an operating system 338 and one or more application programs, modules or services for implementing the features disclosed herein including at least the data service management module 336. The data service management module 336, in some examples, may facilitate providing data services to the client 306. For instance, the data service management module 336 may receive and process a request of a client for a data service, select and deploy the UAV 300, and receive data from the UAV 300 as part of providing the data service.

Processing the request may include authenticating the client, determining a location of a computing device to receive the data service, which may be referred to herein as a recipient computing device; a time frame for providing the delivery service; and an identifier of the recipient computing device (e.g., a serial number, a MAC address, or other identifiers). Additionally, the data service management module 336 may generate a token or credentials associated with the request. In this manner, additional security measures may be implemented to ensure that the data service is provided to the proper recipient computing device. For example, the request may be considered as a user session, where the data service may be provided only if there is a valid user session. Tokens may be generated based on, for example, the time of the request, information about the client 306, information about the recipient computing device, and other information. The tokens may also have expiry dates. The data service management module 336 may provide a token to the client 306 in response to the request and may cause the client 306 to send or may send the token to the recipient computing device if different from the client 306.

Selecting the UAV 300 may include determining from a fleet of UAVs that the UAV 300 may be capable of providing the data service based on a number of factors. The data service management module 336 may, for example, consider the distance between the UAV 300 and the location of the recipient computing device, the requested time frame for the data service, the type of the data service, a return location (e.g., a location of a particular server of the server 304 to which the data from the UAV 300 should be transmitted), and/or other factors. Deploying the UAV 300 may include providing the UAV 300 with information about the recipient computing device, any token, the requested data service, and/or other information that may cause the UAV 300 to fly to the location and provide the data service.

Receiving data from the UAV 300 as part of providing the data service may include multiple operations based on the type of the data service. For example, if the data service is for data storage, the UAV 300 may fly back to a location associated with the server 304. Once at that location, the data service management module 336 may cause the UAV 300 to transmit data from the computing system of the UAV 300 to the server 304. Thereafter, the data service management module 336 or some other service of the server 304 may route the data to an appropriate storage device of the server 304. In another example, if the data service is for data connectivity, while the UAV 300 may be located at the location associated with the recipient computing device, the data service management module 336 may cause the server 304 to receive the data from the UAV 300 and route the data onto a network.

In some examples, the server 304 may also include additional storage 340, which may include removable storage and/or non-removable storage. The additional storage 340 may include, but is not limited to, magnetic storage, optical disks, and/or tape storage. The disk drives and their associated computer-readable media may provide non-volatile storage of computer-readable instructions, data structures, program modules, and other data for the computing devices.

The memory 332 and the additional storage 340, both removable and non-removable, are examples of computer-readable storage media. For example, computer-readable storage media may include volatile or non-volatile, removable, or non-removable media implemented in any suitable method or technology for storage of information such as computer-readable instructions, data structures, program modules, or other data. As used herein, modules may refer to programming modules executed by computing systems (e.g., processors). The modules of the server 304 may include one or more components. The server 304 may also include I/O device(s) and/or ports 342, such as for enabling connection with a keyboard, a mouse, a pen, a voice input device, a touch input device, a display, speakers, a printer, or other I/O device.

Turning now to the details of the UAV 300, the UAV 300 may include some or all of the components of the UAV 200 described in connection with FIG. 2. In an illustrative embodiment, the UAV 300 may include a computing system 302 similar to the computing system 204 of FIG. 2. The computing system 302 may include at least one memory 314 and one or more processing units (or processor(s)) 316. The processor(s) 316 may be implemented as appropriate in hardware, computer-executable instructions, software, firmware, or combinations thereof. Computer-executable instruction, software or firmware implementations of the processor(s) 316 may include computer-executable or machine-executable instructions written in any suitable programming language to perform the various functions described. The memory 314 may include more than one memory and may be distributed throughout the computing system 302. The memory 314 may store program instructions (e.g., a data storage module 320) that are loadable and executable on the processor(s) 316, as well as data generated during the execution of these programs. Depending on the configuration and type of memory, the memory 314 may be volatile (such as random access memory (RAM)) and/or non-volatile (such as read-only memory (ROM), flash memory, or other memory).

The computing system 302 may also include additional removable storage and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 314 may include multiple different types of memory, such as static random access memory (SRAM), dynamic random access memory (DRAM), or ROM.

In some examples, the computing system 302 may also include additional storage 324, which may include removable storage and/or non-removable storage. The additional storage 324 may include, but is not limited to, magnetic storage, optical discs, and/or tape storage. The disk drives and their associated computer-readable media may provide non-volatile storage of computer-readable instructions, data structures, program modules, and other data for the computing devices. Data received from the client 306 may be stored in the memory 314 and/or the additional storage 324 depending on, for example, the size of the data and the amount of available storage.

The memory 314 and the additional storage 324, both removable and non-removable, are examples of computer-readable storage media. For example, computer-readable storage media may include volatile or non-volatile, removable, or non-removable media implemented in any suitable method or technology for storage of information such as computer-readable instructions, data structures, program modules, or other data. The modules of the computing system 302 may include one or more components.

Turning to the contents of the memory 314 in more detail, the memory 314 may include an operating system 318 and one or more application programs, modules or services for implementing the features disclosed herein including at least a data service module 320. If the computing system 302 also integrates a management system, the memory 314 may include a management module 322 configured to provide flight operation management functions.

The data service module 320 may be configured to provide a portion or all of a requested data service. For example, if the client 306 requests data storage, the data service module 320 may facilitate receiving and storing the data on the computing system 302 and transmitting the stored data to the server 304. Similarly, if data connectivity is requested, the data service module 320 may be configured to provide connectivity functions, such as routing data between the client 306 and the server 304 through the computing system 302. In an illustration, the data service module 320 may implement various connectivity protocols such as ones related to 802.11, 802.16, cellular, or other protocols to render the computing system 302 and, more generally the UAV 300, as a local access point or a base station.

Providing the portion of the data service may also include a number of other operations. For example, the data service module 320 may receive information about a request for the data service, such as location and identifier of a recipient computing device, time frame, and/or associated token. The data service module 320 may also direct a management module of the UAV 300, such as the management module 322, to fly the UAV 300 to the location. Once at the location, the data service module 320 may authenticate the recipient computing device based on credentials of the recipient computing device (or of a user operating the recipient computing device) and the token. If authentication is successful, the data service module 320 may provide the data service (e.g., receive and store the data from the recipient computing device or provide data connectivity to the recipient computing device) based on the timeframe. Thereafter, the data service module may direct the management module to fly the UAV 300 back to a location associated with server 304. At that location, the data service module 320 may authenticate the UAV 300 to the server 304 and provide any data received from the recipient computing device. These and other features are further illustrated in FIG. 5.

The computing system 302 may also include I/O device(s) 328 (e.g., interfaces, ports) such as for enabling connection with the server 304, the client 306, and the recipient computing device. The I/O device(s) 328 may also enable communication with the other systems of the UAV 300 (e.g., a management system, a propulsion system, and a retaining system).

Figure 4:
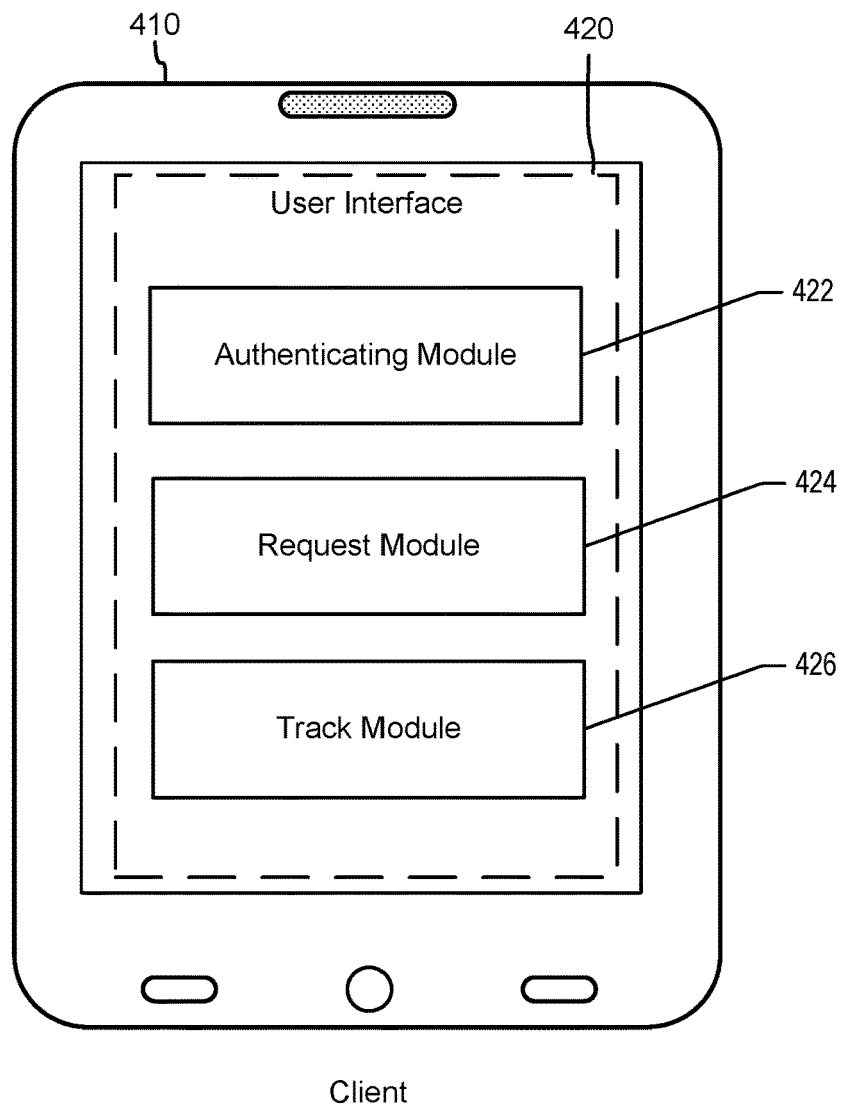
FIG. 4 illustrates an example interface of a user computing device for requesting a data service, according to embodiments.

Turning to FIG. 4, that figure illustrates an example client 410 configured to authenticate a user, request a data service, and track a status associated with a data service. The client 410 may be an example of the client 306 described in connection with FIG. 3. In particular, a user may operate the client 410 to connect over, for example, a network to a server and request the data service. The data service or a portion of the data service may be facilitated by a UAV rather than the network.

To facilitate such user interactions, the client 410 may be configured to provide the user interface 420 to use touch screen and/or other technologies. The user interface 420 may include one or more windows that may display outputs of and may allow inputs to one or more processes. A web browser is an example of such processes and may be configured to present various types of information about the data service. This information may be presented by using various modules, such as an authentication module 422 for authenticating the user, a request module 424 for requesting the data service, and a track module 426 for tracking the status associated with the data service. The presented information may be organized in a same window or may be distributed across a plurality of windows of the user interface 420. The various modules may interface with a data service management module of the server and/or with the data service module of the UAV to receive and/or provide the information.

The authentication module 422 may be configured to authenticate the user, or the client 410, to the server from which the data service may be requested. Authentication may include providing user credentials, such as user name and password, a certificate issued to the user and stored at the client 410, or some other credentials. The server (e.g., the data service management module or some other module) may authenticate the user based on the credentials by, for example, looking up a user account or checking the certificate.

Further, the authentication module 422 may receive a token or some other credentials from the server based on the request for the data service. The token may include a key from a pair of symmetric keys or a public key from a pair of asymmetric keys. The server (e.g., the data service management module or some other module) may have generated and transmitted the token to the client 410 using information from the request. The authentication module 422 may be configured to store the token locally on the client 410 and to distribute the token to any other recipient computing device (e.g., a computing device of the user that may receive the data service).

The request module 424 may be configured to generate a request for a data service and submit the request to the server. The request may include information about the client 410, the recipient computing device if different from the client 410, the type of the data service, and other data service-related information. The request module 424 may also enable the user to schedule future requests by inputting such information in, for example, a calendar for transmission to the server.

The track module 426 may be configured to receive and present status information associated with the data service. For example, the track module 426 may receive from the server or from the UAV, information about whether authentication was successful, whether the request was received, whether the UAV was deployed, an identifier of the UAV, a current location (e.g., GPS coordinates) of the UAV, a progress of the data service in association with the UAV (e.g., amount of data that has been uploaded to the UAV from the recipient client device), a progress of the data service in association with the server (e.g., amount of data that has been downloaded to the server from the UAV), billing information, and other data service-related information.

As such, the user interface 420 may provide an easy, simple user interface to authenticate a user, request a data service, and track information about the data service. This may result in enhancing the user's experience by allowing the user to request and schedule requests for a data service and track information about the data service that may not be otherwise properly available over a network.

Figure 5:
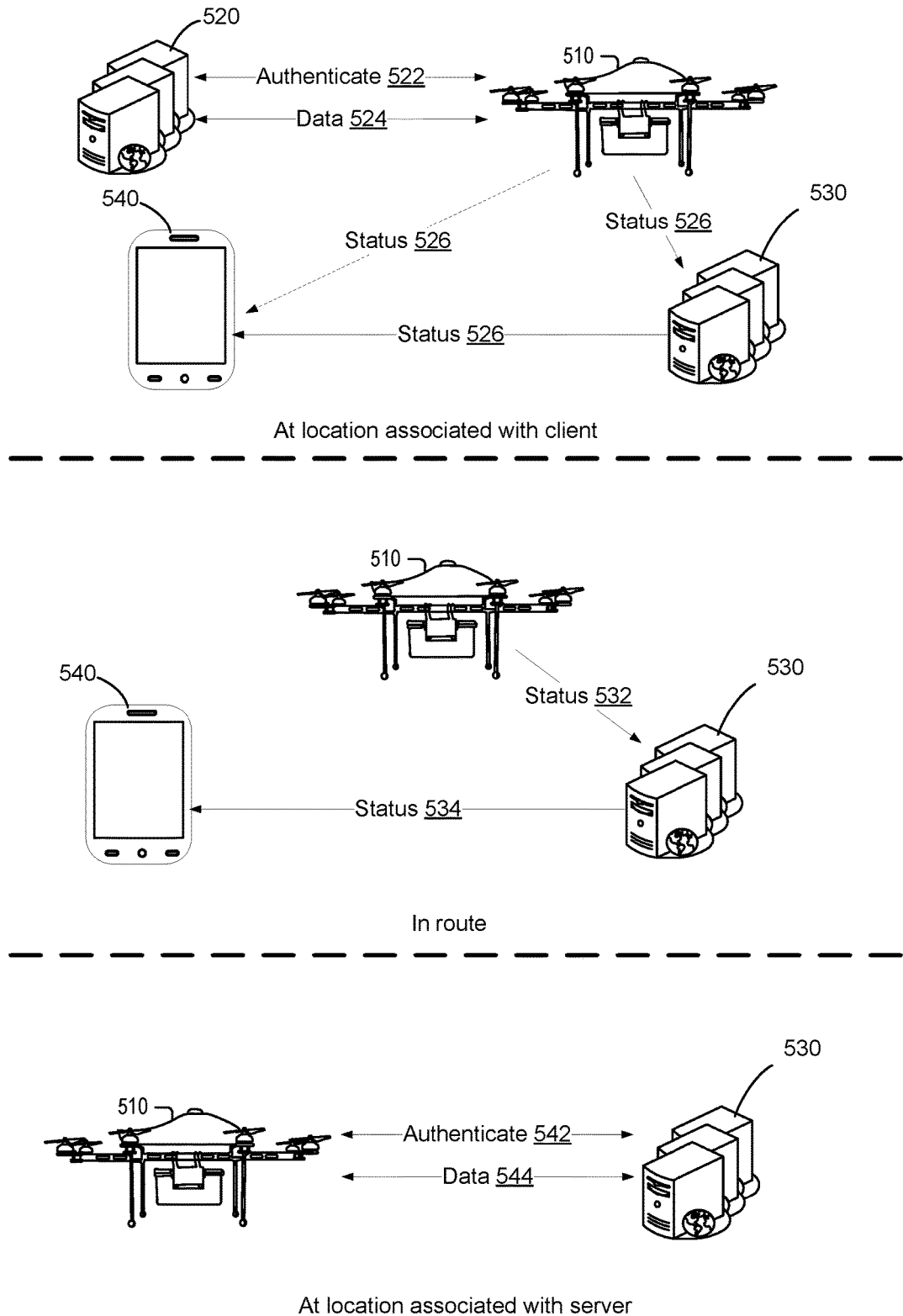
FIG. 5 illustrates example interactions between components of a computing environment for providing a data service, according to embodiments.

Turning to FIG. 5, that figure illustrates example interactions between components of a computing environment for providing a data service, including a UAV 510, a recipient computing device 520, a server 530, and a client 540. In particular, different types of interactions may exist depending on a phase of providing the data service. As illustrated, there may be multiple phases including a phase when the UAV 510 is at a location associated with the client 540, a phase when the UAV 510 is in route to that location or to another location associated with the server 530, and a phase when the UAV is at the location associated with the server 530.

Turning to the phase when the UAV 510 is at the location associated with the client 540, the UAV 510 may have received information about that location from the server 530. The information may have been derived from a request received at the server 530 from the client 540. The location may indicate an area (e.g., an area defined with an address, GPS coordinates, or some other location information) where the recipient computing device 520 may be located or where access to the recipient computing device 520 may be established. For example, the UAV 510 may directly communicate with the recipient computing device 520 (e.g., point-to-point communication) or may have access to the recipient computing device 520 via, for example, an access point or some other network node local to the recipient computing device 520.

Once at the location or within a range of the location, the UAV 510 may authenticate 522 the recipient computing device 520 and the UAV 510 (e.g., a computing system of the UAV 510 or a service provider of the data service) and exchange data 524 as part of providing a portion of the data service. Once authentication 522 is complete, the UAV 510 may communicate with the recipient computing device 520 to cause the data exchange to occur. For example, if the data service includes data storage, the data 524 may be uploaded or provided to the UAV 510 (e.g., to the computing system on the UAV 510). If the data service includes data connectivity, the data 524 may be sent to and received from the UAV 510.

Being within the range of the location may depend on a number of factors including, for example, the type of interface between the UAV 510 and the recipient computing device 520 and/or the type of the data service. For example, the interface may involve one or more of a wireless connection for exchanging the data 524, a wired connection for exchanging the data 524, or a physical retention of a client storage device at the UAV 510, where the client storage device may store the data 524.

If a wireless interface is used, the UAV 510 may fly to a range proximate to the location associated with the client 540 such that sufficient bandwidth may exist to exchange the data 524. The UAV 510 may stay airborne or may land on a surface during the data exchange. At various intervals during the data exchange, at various intervals between providing the data service, or based on an event, the UAV 510 may be repositioned to adjust for the bandwidth. For example, the UAV 510 may be in a first range and measure a first bandwidth. Subsequently, the UAV 510 may move to a second range and measure a second bandwidth. If the bandwidth increases, the UAV 510 may stay at the second range. Otherwise, the UAV 510 may move back to the first range. In another example, the UAV 510 may use a stored or predefined range. If the UAV 510 detects that the bandwidth may be less than expected at that range, the UAV 510 may move to another range until the bandwidth improves. The range that may provide the maximum bandwidth along with that bandwidth may be stored locally on the UAV 510 or provided to and stored at the server 530 in association with an account of the user. In subsequent flights, the UAV 510 may first be positioned at the stored range.

If a wired interface is used, the UAV 510 may fly to a range proximate to the location associated with the client 540 such that a wired connection may be established. The UAV 510 may stay airborne or may land on a surface during the data exchange. The wired connection may be established manually or automatically. For example, once at the range, the UAV 510 may send a status message 526 that may get presented at a user interface of the client 540. The status message 526 may include information about the current location of the UAV 510. Thereafter, a user may access that location and establish the wired connection. In another example, the UAV 510 may communicate the current location and orientation of the UAV 510 to the recipient computing device 520. The recipient computing device 520 may be configured to automatically extend a structure and accordingly establish the wired connection.

If the retention of the client storage device is used, the UAV 510 may fly to a range proximate to the location associated with the client 540 such that the retention may be accomplished (e.g., a container opened and the client storage device placed therein). The UAV 510 may stay airborne or may land on a surface during that time. The retention may be completed manually or automatically. For example, once at the range, the UAV 510 may send the status message 526. Thereafter, the user may access that location and provide the client storage device to a retaining system of the UAV 510. In another example, the UAV 510 may communicate the current location and orientation of the UAV 510 to the recipient computing device 520. The recipient computing device 520 may be configured to automatically extend a structure and accordingly provide the client storage device to the retaining system of the UAV 510.

As further illustrated in FIG. 5, the UAV 510 may generate and provide the status message 526. This message may include information about the status associated with providing the data service when the UAV 510 is at the location associated with the client 540 or within a range of that location. For example, the status message 526 may indicate the current location of the UAV 510, that authentication is complete, that the connection is established, and a progress associated with exchanging the data 524. The status message 526 may be sent to the server 530, which may then send it to the client 540, or may be sent to the client 540 independently of the server 530.

Before providing a portion of the data service, the UAV 510 may be in route to the location associated with the client 540. Similarly, once the portion of the data service is provided, the UAV 510 may be in route to the location associated with the server 530. Interactions between the UAV 510, the server 530, and the client 540 in both route directions may be similar. In the interest of clarity of explanation, the similarities are not repeated herein. Instead and as illustrated in FIG. 5, the route back to the location associated with the server 530 is described.

In that phase, the UAV 510 may be configured to provide various operations including flying back, protecting any data stored on the UAV 510, and providing status information. Flying back may involve using a management system of the UAV 510 to fly the UAV to the location associated with the server 530. Protecting the data may involve various techniques to reduce or eliminate the risk of unauthorized access to the data. This may be the case when, for example, the UAV 510 is at risk of crashing or being intercepted. The protection techniques may include encrypting the data with a public key associated with the server 530 and/or a public key associated with the client 540. The data may also be encrypted using a key retrieved from a token generated based on the request to provide the data service. In another example, the protection may involve configuring the interfaces of the UAV 510 to allow a data upload by any user, while allowing a data download by only a service provider. Further, the implemented techniques may include detecting whether a risk of unauthorized access may exist and erasing the data accordingly. For example, if the UAV 510 detects that the power supply may be low prohibiting the return to the server location, the UAV 510 may delete the data.

While in route, the UAV 510 may provide status messages 532 to the server 530. These messages may include, for example, information about the current location of the UAV 510, the health of the UAV 510 (e.g., power supply, flying speed, estimated time of arrival), and other UAV-related information. Unlike the status messages 526 that is provided directly from the UAV 510 to the client 540, a direct communication link may not exist between the UAV 510 and the client 540. Thus, the server 530 may provide another status message 534 to the client 540. This message may be based on the status message 532 and, thus, may be the same or may be different from the status message 532. In an example, if the status message 532 indicates that the UAV is at risk of crashing and that the data has been erased, the status message 534 may indicate that providing the data service may have failed and that another UAV may be deployed.

Turning to the phase when the UAV 510 is at the location associated with the server 530, that location may indicate an area (e.g., an area defined with an address, GPS coordinates, or some other location information) where the server 530 may be located or where access to the server 530 may be established. For example, the UAV 510 may directly communicate with the server 530 (e.g., point-to-point communication). In another example, the UAV 510 may have access to the server 530 via, for example, an access point or some other network node local to the server 530. In yet another example, the location may be of another server or computing resource that the server 530 may have selected as a recipient of data from the UAV 510 (e.g., a storage device on a network managed by the server 530, where the storage device may have been selected to store data uploaded from the recipient computing device 520 to the UAV 510). The UAV 510 may have received information about that location from the server 530.

Once at the location or within a range of the location, the UAV 510 may authenticate 542 the server 530 (or the other computing resource) and the UAV 510 and exchange data 544 as part of providing the portion of the data service. For example, if the data service includes data storage, the data 544 may be downloaded or provided from the UAV 510. Once authentication 542 is complete, the UAV 510 may communicate with the server 530 (or the other computing resource) to cause the data exchange to occur.

Being within the range of the location may depend on a number of factors including, for example, the type of the available interface and/or the type of the data service. For example, if the data service is for data connectivity, a long range may be used. In another example, if the data service includes data storage, the range may depend on whether the interface may be wireless or wired, or whether the data 544 is to be physically retained on a client storage device. The determination and use of the range may be similar to what was described in connection with the phase of the UAV 510 being at the location associated with the client 540. The similarities are not repeated herein in the interest of clarity of explanation.

A status message is sent to the client 540 once the UAV 510 may be at or within a range of the location associated with the server 530. Once the data 544 has been downloaded or as the data 544 is being downloaded, the server 530 may send the data 544 to a computing resource of the server or to other computing devices over a network. In addition, the server 530 may instruct the UAV 510 to delete the data 544 or the UAV 510 may automatically delete the data 544 from the computing system of the UAV 510. A status message may be also sent to the client 540 based on the data exchange. This message may indicate, for example, an amount of the data 544 downloaded from the UAV 530 and the remaining amount.

As such, the computing environment illustrated in FIG. 5 may allow data services to be provided based on using a UAV. In particular, in various phases, the UAV may perform different operations based on the requested data service(s) and the available interfaces. As such, whether a wireless, wired, or some other type of interface to a client and/or a server exists, the UAV may be configured to receive the data from the client and move the data to a server.

In the interest of clarity of explanation, FIG. 5 illustrates the use of a single UAV 510. However, the embodied techniques may not be limited as such. For example, multiple UAVs may be used. Each of these UAVs may have similar components as the ones of the UAV 510 (e.g., similar computing systems). In particular, using multiple UAVs may allow providing hand-off, security, redundancy, and other functions.

In an embodiment the UAV 510 may be configured to hand off any data associated with the client 540 to another UAV based on a number of factors. For example, when providing data storage, the UAV 510 may transmit stored data to another UAV. This may allow for data redundancy, increased security, and improved quality of service. In an illustrative use case, if the UAV 510 is incapable of reaching the location associated with the server 530, the UAV 510 may send a message indicating so. In turn, the server 530 may deploy another UAV to the location of the UAV 510. When the other UAV arrives at this location, data stored at the UAV 510 may be provided from the UAV 510 to the other UAV. Thereafter, the other UAV may fly to the location of the server 530 to provide the data to the server 530. In another example, when providing data connectivity, multiple UAVs may be deployed in addition to the UAV 510. The various UAVs may form a connectivity network, for example a point-to-point network. As such, when data is received from the recipient computing device 520, the UAV 510 may provide this data to the next UAV in the network.

In an embodiment, multiple UAVs may be deployed to provide redundancy. For example, a client may request data to be stored at multiple resources at different locations for redundancies. In this example, the server 530 may deploy one UAV (e.g., the UAV 510) or multiple UAVs to the location of the recipient computing device 520. If one UAV is deployed, this UAV may receive the data from the recipient computing device 520 and transmit this data to the other UAVs. If multiple UAVs are deployed, each of these UAVs may receive the data from the recipient computing device 520. Regardless of the number of deployed UAVs, each of the UAVs may fly back to one of the different locations of the multiple resources such that, collectively, the data may be downloaded at these resources.

In an embodiment, multiple UAVs may be deployed to provide security. For example, rather than providing a whole block of data from the recipient computing device 520 to the UAV 510, the data may be divided into sub-blocks. Each of the blocks may be provided to one of the UAVs. As such, if one of the UAVs is compromised (e.g., the corresponding computing system is accessed by an unauthorized third party), only the corresponding sub-block of data may be at risk, rather than the whole data block.

In addition, a client using one or more UAVs for moving data may be charged using a business model. The business model may account for multiple factors, such as the number of UAVs used, the location of the recipient computing device 540, the amount of the data 544, the type of the service, the level of security, how fast the data 544 should be delivered, a type of membership or account of the client, and other factors. For example, the higher the number of UAVs, the more distant the recipient computing device 540, the larger data amount, or the faster delivery may be, the higher the charge may become.

Figure 6:
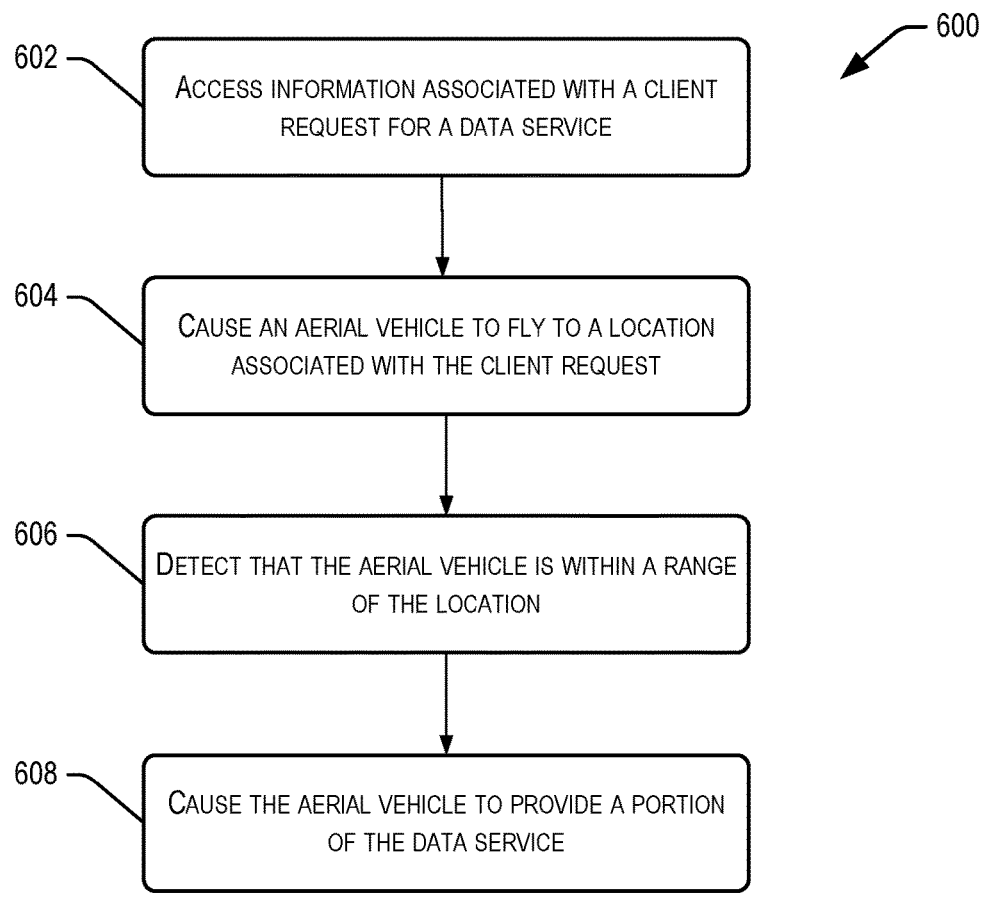
FIG. 6 illustrates an example flow for providing a data service, according to embodiments.
Figure 7:
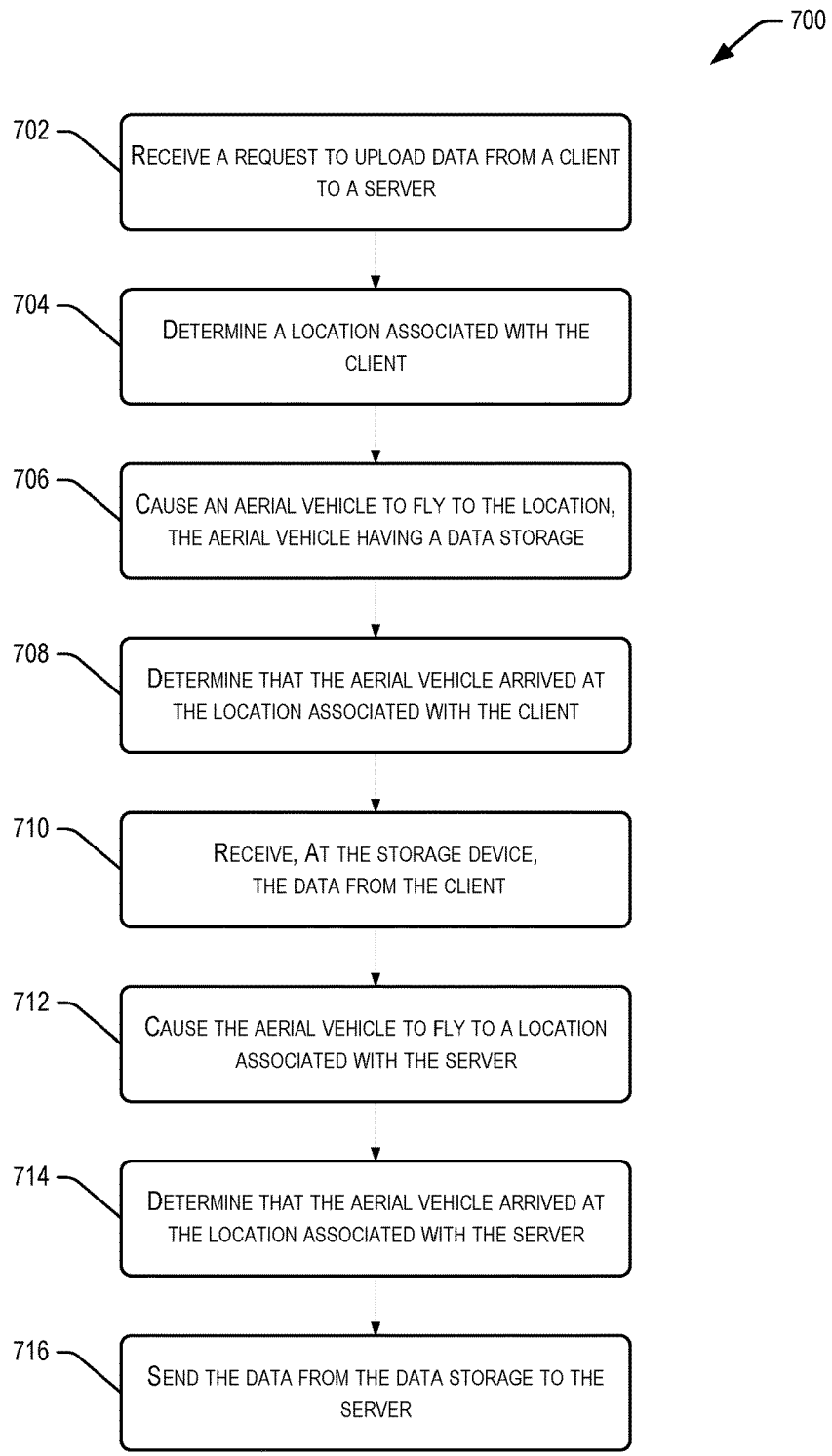
FIG. 7 illustrates an example flow for providing data storage as a data service, according to embodiments.

Turning to FIGS. 6-7, those figures illustrate example flows for providing a data service based on a UAV. FIG. 6 illustrates an example flow 600 deploying the UAV to provide the data service. In comparison, FIG. 7 illustrates an example flow 700 for using the UAV to, for example, facilitate data storage. Some of the operations of the example flow 600 of FIG. 6 may be further embodied in operations of the example flow 700 of FIG. 7. Thus, some operations may be similar. Such similarities are not repeated herein in the interest of clarity of explanation.

Further, in the illustrative operations, some of the operations or functions may be embodied in, and fully or partially automated by, modules executed by one or more processors. For example, a data service module of the UAV, such as the data service module 320 described in connection with FIG. 3, and a data service management of a server, such as the data service management module 336 described in connection with FIG. 3, may be configured to perform some or all of the operations. Nevertheless, a combination of other computing devices and modules may be additionally or alternatively used. Also, while the operations are illustrated in a particular order, it should be understood that no particular order is necessary and that one or more operations may be omitted, skipped, and/or reordered.

The example flow 600 of FIG. 6 includes operations 602-608. At operation 602, where information associated with a client request for a data service is accessed. For example, a data service module of a UAV may receive this information from a data service management module of a server. In turn the data service management module may have derived this information from the client request received at the server. The information may identify the client, a recipient computing device, a type of the data service, a location where the data service may be provided, a time frame for providing the data service, and/or other information related to the data service.

At operation 604, the UAV flies to a location associated with the client request. For example, the data service module may communicate with a management system of the UAV to cause the aerial vehicle to fly to the location. Further, the data service management module may have selected the UAV from a fleet of UAVs based on a number of factors, including the location, the type of the data service, the time frame, the availability of the UAV relative to other UAVs, and the capability of the UAV.

At operation 606, the UAV is detected to be within a range of the location. For example, the data service module may receive current location information of the UAV from the management system and may determine that the UAV is within a range proper for establishing a communication with the recipient computing device. This range may depend on the type of data service and the type of interface to the recipient computing device. For example, if the data service includes data storage and a wireless interface is available, the range may be a distance sufficient to ensure a proper bandwidth for transferring the data.

At operation 608, the UAV provides a portion of the data service. For example, while within the range, the data service module may use the established communication to authenticate and allow a data exchange with the recipient computing device. If the data service includes data storage, the data service module may enable the recipient computing device to upload data to a computing system of the UAV for storage, at least temporarily. If the data service includes data connectivity, the data service module may enable routing of the data to and from the recipient computing device onto a network.

Turning to FIG. 7, that figure illustrates an example flow 700 that may be implemented to provide a data service, such as data storage, by using a UAV. The example flow 700 includes operations 702-714. At operation 702, a request to upload data from a client to a server is received. This request may be received by the server from the client and may be processed by a data service management module or other modules hosted on the server.

At operation 704, a location associated with the client is determined. For example, the request may include information about the location. In another example, the data service management module may look up an account associated with the client. The account may store information about the location.

At operation 706, a UAV is deployed to the location. The UAV may have a computing system, including a storage device and/or may have a retaining system. In an example, the data service management module may select the UAV from a fleet of UAVs and may communicate with a data service module hosted on the computing system. In this way, the data service management module may provide information about the client, a recipient computing device, the type of the data service, and other data service related information to the data service module. In turn, the data service module may communicate with a management module, hosted on the computing system or on a management system of the UAV, to cause the UAV to fly to the location.

At operation 708, a determination is made that the UAV arrived at the location. For example, the data service module may receive location information of the UAV from the management module. If the UAV's current location is within a range of the location associated with the client, the data service module may determine that the UAV arrived at the location. The range may depend on the type of the data service and the available interface to the recipient computing device.

At operation 710, the data from the client is received at the UAV. In an example, the data may be stored on the storage device of the UAV. In another example, the data may be stored on a client storage device and retained by the retaining system of the UAV. In either case, based on determining that the UAV arrived at the location, the data service management module may establish communication with the recipient computing device and/or the client causing the data to be sent to the UAV.

At operation 712, the UAV flies to a location associated with the server. For example, once the data has been received at the UAV, the data service module may terminate the communication with the recipient computing device and may cause the management module to fly the UAV to the location associated with the server.

At operation 714, a determination is made that the UAV arrived at the location associated with the server. For example, the data service module may determine that the UAV is within a range of the location based on the UAV location information. The data service management module of the server may also make a similar determination.

At operation 716, the data is provided from the UAV to the server. For example, based on determining that the UAV arrived at the location, the data service module and/or the data service management module may cause the UAV and the server to establish a communication link. The data stored at the UAV may be then transmitted over the communication link to the server. Additionally or alternatively, if the data was stored on a client storage device and retained at the retaining system of the UAV, the UAV may render the client storage device available.

As such, a UAV may be configured and used to move data from a client to a server. Moving the data may bypass using a network. Instead of transmitting the data over the network, the data may be transmitted via the UAV by uploading the data from the client to a storage device of the UAV and downloading the data from the storage device of the UAV to the server. In another example, the data may be stored on a client storage device. That device may be retained and delivered from the client to the server.

Figure 8:
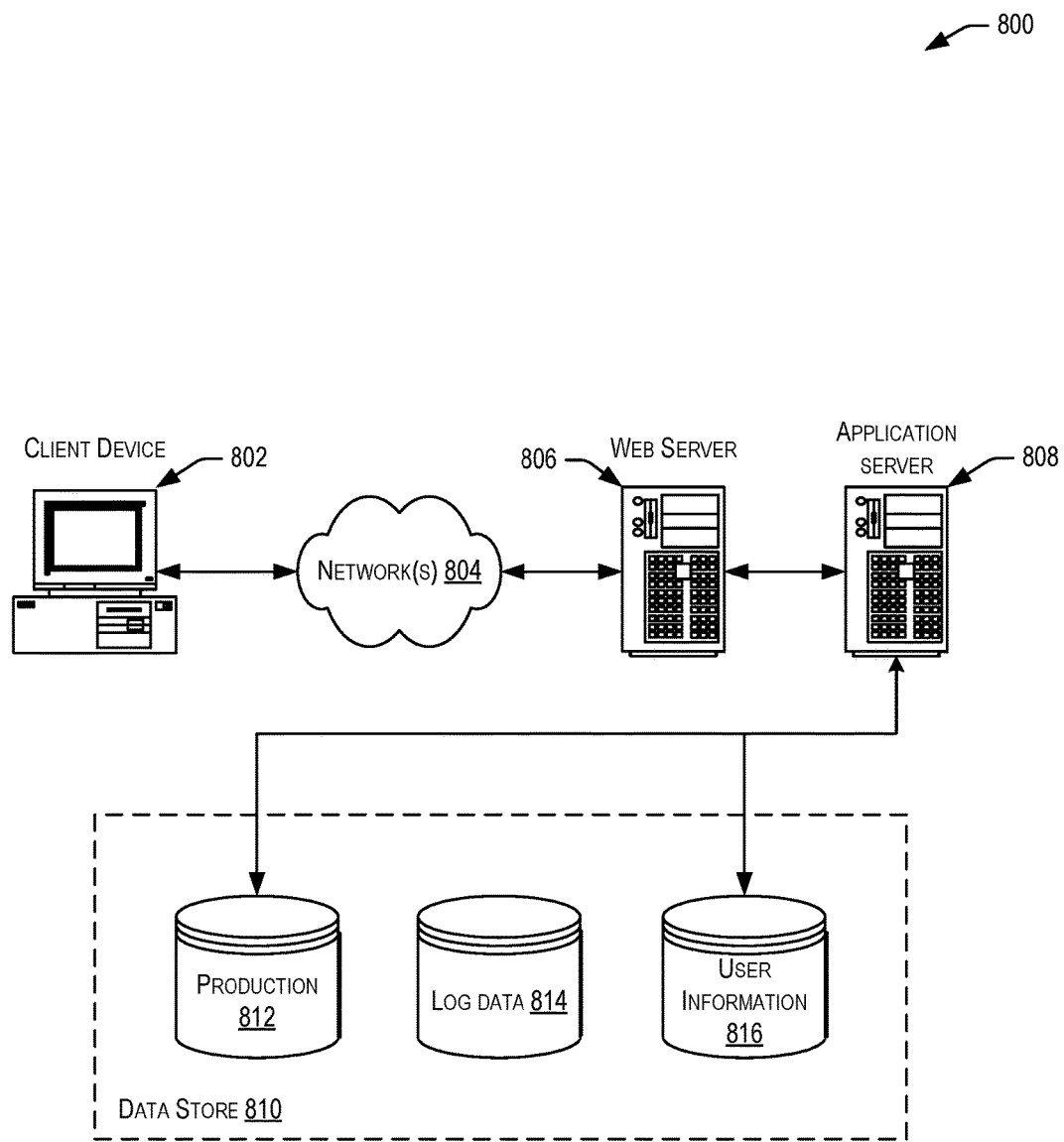
FIG. 8 illustrates an environment in which various embodiments may be implemented.

Turning to FIG. 8, the figure illustrates aspects of an example environment 800 capable of implementing the above-described structures and functions. As will be appreciated, although a Web-based environment is used for purposes of explanation, different environments may be used, as appropriate, to implement various embodiments. The environment includes an electronic client device 802, which may include any appropriate device operable to send and receive requests, messages, or information over an appropriate network(s) 804 and convey information back to a user of the device. Examples of such client devices include personal computers, cell phones, handheld messaging devices, laptop computers, set-top boxes, personal data assistants, electronic book readers, or any other computing device. The network(s) 804 may include any appropriate network, including an intranet, the Internet, a cellular network, a local area network or any other such network or combination thereof. Components used for such a system may depend at least in part upon the type of network and/or environment selected. Protocols and components for communicating via such a network are well known and will not be discussed herein in detail. Communication over the network may be enabled by wired or wireless connections and combinations thereof. In this example, the network includes the Internet, and the environment includes a Web server 806 for receiving requests and serving content in response thereto, although for other networks an alternative device serving a similar purpose could be used as would be apparent to one of ordinary skill in the art.

The illustrative environment includes at least one application server 808 and a data store 810. It should be understood that there may be several application servers, layers, or other elements, processes or components, which may be chained or otherwise configured, which may interact to perform tasks such as obtaining data from an appropriate data store. As used herein the term "data store" refers to any device or combination of devices capable of storing, accessing, and/or retrieving data, which may include any combination and number of data servers, databases, data storage devices and data storage media, in any standard, distributed or clustered environment. The application server may include any appropriate hardware and software for integrating with the data store as needed to execute aspects of one or more applications for the client device, handling a majority of the data access and business logic for an application. The application server 808 provides access control services in cooperation with the data store 810, and is able to generate content such as text, graphics, audio files and/or video files to be transferred to the user, which may be served to the user by the Web server in the form of HTML, XML or another appropriate structured language in this example. The handling of all requests and responses, as well as the delivery of content between the client device 802 and the application server 808, may be handled by the Web server 806. It should be understood that the Web and application servers 806 and 808 are not required and are merely example components, as structured code discussed herein may be executed on any appropriate device or host machine as discussed elsewhere herein.

The data store 810 may include several separate data tables, databases or other data storage mechanisms and media for storing data relating to a particular aspect. For example, the data store 810 illustrated includes mechanisms for storing production data 812 and user information 816, which may be used to serve content for the production side. The data store 810 is also shown to include a mechanism for storing log data 814, which may be used for reporting, analysis, or other such purposes. It should be understood that there may be many other aspects that may need to be stored in the data store 810, such as for page image information and to access correct information, which may be stored in any of the above listed mechanisms as appropriate or in additional mechanisms in the data store 810. The data store 810 is operable, through logic associated therewith, to receive instructions from the application server 808 and obtain, update or otherwise process data in response thereto. In one example, a user might submit a search request for a certain type of item. In this case, the data store might access the user information to verify the identity of the user, and may access the catalog detail information to obtain information about items of that type. The information then may be returned to the user, such as in a results listing on a web page that the user is able to view via a browser on the client device 802. Information for a particular item of interest may be viewed in a dedicated page or window of the browser.

Each server typically will include an operating system that provides executable program instructions for the general administration and operation of that server, and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available, and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 8. Thus, the depiction of environment 800 in FIG. 8 should be taken as being illustrative in nature, and not limiting to the scope of the disclosure.

The various embodiments further may be implemented in a wide variety of operating environments, which in some cases may include one or more user computers, computing devices or processing devices which may be used to operate any of a number of applications. User or client devices may include any of a number of general purpose personal computers, such as desktop or laptop computers running a standard operating system, as well as cellular, wireless and handheld devices running mobile software and capable of supporting a number of networking and messaging protocols. Such a system also may include a number of workstations running any of a variety of commercially-available operating systems and other known applications for purposes such as development and database management. These devices also may include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS, and APPLETALK. The network may be, for example, a local area network, a wide-area network, a virtual private network, the Internet, an intranet, an extranet, a public switched telephone network, an infrared network, a wireless network, and any combination thereof.

In embodiments utilizing a Web server, the Web server may run any of a variety of server or mid-tier applications, including HTTP servers, FTP servers, CGI servers, data servers, JAVA servers, and business application servers. The server(s) may also be capable of executing programs or scripts in response to requests from user devices, such as by executing one or more Web applications that may be implemented as one or more scripts or programs written in any programming language, such as JAVA, C, C# or C++, or any scripting language, such as Perl, Python or TCL, as well as combinations thereof. The server(s) may also include database servers, including without limitation those commercially available from ORACLE, MICROSOFT, SYBASE, and IBM.

The environment may include a variety of data stores and other memory and storage media as discussed above. These may reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device may include hardware elements that may be electrically coupled via a bus, the elements including, for example, at least one central processing unit (CPU), at least one input device (e.g., a mouse, keyboard, controller, touch screen or keypad), and at least one output device (e.g., a display device, printer or speaker). Such a system may also include one or more storage devices, such as disk drives, optical storage devices, and solid-state storage devices such as RAM or ROM, as well as removable media devices, memory cards, flash cards, etc.

Such devices also may include a computer-readable storage media reader, a communications device (e.g., a modem, a network card (wireless or wired), an infrared communication device, etc.) and working memory as described above. The computer-readable storage media reader may be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer-readable media for containing code, or portions of code, may include any appropriate media known or used in the art, including storage media and communication media, such as but not limited to volatile and non-volatile, removable and non-removable media implemented in any method or technology for storage and/or transmission of information such as computer-readable instructions, data structures, program modules or other data, including RAM, ROM, EEPROM, flash memory or other memory technology, CD-ROM, DVD, or other optical storage, magnetic cassettes, magnetic tape, magnetic disk storage or other magnetic storage devices or any other medium which may be used to store the desired information and which may be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein may be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as that included in the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z in order for each to be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate, and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method performed by a computing system of an unmanned aerial vehicle, the computer-implemented method comprising:

accessing information associated with a request for a data service from a provider, the information identifying a location of a computing device to receive the data service, the provider associated with the unmanned aerial vehicle;

causing the unmanned aerial vehicle to fly to the location of the computing device;

detecting that the unmanned aerial vehicle is within a first range of the location of the computing device;

establishing a communication with the computing device based at least in part on the detecting that the unmanned aerial vehicle is within the first range;

repositioning the unmanned aerial vehicle to be within a second range of the location of the computing device by at least measuring a first bandwidth of the communication at the first range and a second bandwidth of the communication at the second range and determining that the second bandwidth is larger than the first bandwidth; and providing at least a portion of the data service to the computing device based at least in part on the unmanned aerial vehicle being within the second range, the providing comprising using the communication at the second bandwidth.

2. The computer-implemented method of claim 1, wherein the data service comprises a data storage service, and wherein providing at least a portion of the data service comprises:

receiving data from the computing device based at least in part on the communication and on the unmanned aerial vehicle being within the second range of the location of the computing device;

storing the data in a data storage on the unmanned aerial vehicle;

causing the unmanned aerial vehicle to fly to another location of a server of the provider; and sending the data from the data storage on the unmanned aerial vehicle to the server based at least in part on the unmanned aerial vehicle being within a third range of the other location of the server.

3. The computer-implemented method of claim 1, further comprising receiving a token from a computer of the provider, wherein the token is generated by the computer based at least in part on the request for the data service, and wherein the communication is established based at least in part on the token.

4. The computer-implemented method of claim 3, wherein the token comprises an encryption key associated with the computing device or the provider, and wherein providing at least a portion of the data service comprises receiving data from the computing device and encrypting the data based at least in part on the encryption key from the token.

5. The computer-implemented method of claim 1, wherein second information about the first range is stored locally as a predefined range on the unmanned aerial vehicle.

6. The computer-implemented method of claim 5, wherein the second information about the first range identifies an expected bandwidth, and wherein repositioning the unmanned aerial vehicle comprises causing the unmanned aerial vehicle to move away from the first range based at least in part on a determination that the first bandwidth is less than the expected bandwidth.

7. The computer-implemented method of claim 6, further comprising:

changing the predefined range to correspond to the second range; and storing locally on the unmanned aerial vehicle updated second information that identifies the second range as the predefined range, the updated second information usable by the unmanned aerial vehicle in a subsequent flight of the unmanned aerial vehicle for communication with the computing device.

8. The computer-implemented method of claim 1, wherein the information identifying the location of the computing device is received from a computer of the provider, and wherein the information further identifies the first range as a predefined range to establish the communication.

9. The computer-implemented method of claim 8, further comprising providing, to the computer, second information about the second range, the providing causing the computer to store the second range for a subsequent flight of the unmanned aerial vehicle.

10. A non-transitory computer-readable storage medium storing instructions that, upon execution on a computing system of a vehicle, cause the computing system to perform operations comprising:

accessing information associated with a request for a data service from a provider, the information identifying a location of a computing device to receive the data service;

causing the vehicle to move to the location of the computing device;

detecting that the vehicle is within a first range of the location of the computing device;

establishing a communication with the computing device based at least in part on the detecting that the vehicle is within the first range;

repositioning the vehicle to be within a second range of the location of the computing device by at least measuring a first bandwidth of the communication at the first range and a second bandwidth of the communication at the second range and determining that the second bandwidth is larger than the first bandwidth; and providing at least a portion of the data service to the computing device based at least in part on the vehicle being within the second range, the providing comprising using the communication at the second bandwidth.

11. The non-transitory computer-readable storage medium of claim 10, wherein the information is received from a computer of the provider, wherein the communication is established further based at least in part on an authentication of the computing device, and wherein the operations further comprise sending status messages to the computing device and the computer of the provider, the status messages indicating completion of the authentication and a progress for providing at least the portion of the data service.

12. The non-transitory computer-readable storage medium of claim 10, wherein providing at least a portion of the data service comprises receiving data from the computing device and storing the data on a storage device of the vehicle, and wherein the operations further comprise:

determining a second location associated with a server of the provider;

causing the vehicle to move to the second location; and sending the data from the storage device to the server based at least in part on the vehicle arriving at the second location.

13. The non-transitory computer-readable storage medium of claim 10, wherein the request identifies the location, a time frame for the data service, and a type of the data service.

14. A system comprising:

a first vehicle, the first vehicle comprising a computing system storing first computer-readable instructions that, upon execution on the computing system, cause the computing system to:

access information associated with a request for a data service from a provider, the information identifying a location of a computing device to receive the data service;

cause the first vehicle to move to the location of the computing device;

detect that the first vehicle is within a first range of the location of the computing device;

establish a communication with the computing device based at least in part on the detecting that the first vehicle is within the first range;

reposition the first vehicle to be within a second range of the location of the computing device by at least measuring a first bandwidth of the communication at the first range and a second bandwidth of the communication at the second range and determining that the second bandwidth is larger than the first bandwidth; and provide at least a portion of the data service to the computing device based at least in part on the first vehicle being within the second range, the providing comprising using the communication at the second bandwidth.

15. The system of claim 14, wherein the data service comprises a data storage service, and wherein the first vehicle comprises a one directional upload port for data upload from the computing device and a one directional download port for data download, wherein the one directional download port is proprietary to the provider.

16. The system of claim 14, further comprising:

a plurality of unmanned aerial vehicles from which the first vehicle is selected; and a computer of the provider, the computer storing second computer-readable instructions that, upon execution on the computer, cause the computer to:

receive the request for the data service;

identify, based at least in part on the request, the location of the computing device and a time frame for providing at least the portion of the data service;

select the first vehicle from the plurality of unmanned aerial vehicles for deployment to the location based at least in part on a distance between the first vehicle and the location, the time frame, and an availability of the first vehicle relative to another unmanned aerial vehicle from the plurality of unmanned aerial vehicles; and provide the information associated with the request to the first vehicle based at least in part on the first vehicle being selected.

17. The system of claim 16, wherein the second computer-readable instructions further cause the computer of the provider to:

generate, based at least in part on the request, a token associated with the data service; and provide the token to at least the first vehicle or the computing device, wherein the communication is established further based at least in part on the token.

18. The system of claim 16, wherein the second computer-readable instructions further cause the computer of the provider to:

determine that the request is for secure data storage;

determine that data should be split in portions based at least in part on the request for secure data storage; and deploy the first vehicle and a second vehicle of the plurality of unmanned aerial vehicles, each of the first vehicle and the second vehicle being deployed to store a different portion of the portions of the data.

19. The system of claim 16, wherein the second computer-readable instructions further cause the computer of the provider to:

determine that the request is for redundant data storage of data;

determine locations of different storage devices based at least in part on the request for redundant data storage, each of the different storage devices to store a copy of the data; and deploy the first vehicle and a second vehicle of the plurality of unmanned aerial vehicles, each of the first vehicle and the second vehicle being deployed to store a copy of the data and to return to a different location of the locations.

20. The system of claim 14, wherein the data service comprises a data storage service, wherein the system further comprises a second vehicle, and wherein the first computer-readable instructions further cause the computing system of the first vehicle to:

store, on a first storage device of the first vehicle, data received from the computing device based at least in part on the communication; and upon a detection of a risk associated with secure storage of the data, transmit the data from the first storage device to a second storage device of the second vehicle based at least in part on distance proximity between the first vehicle and the second vehicle.

* * * * *